Figure 1:
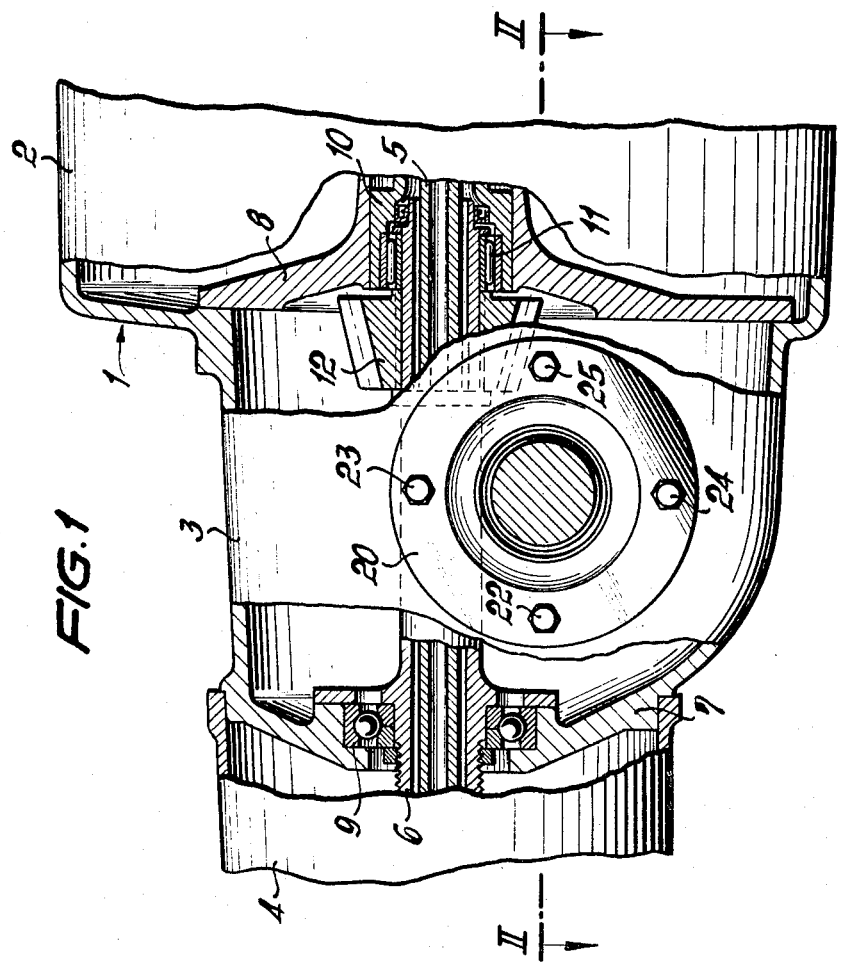

July 30, 1968  E. SZODFRIDT  3,394,610
AXLE GEAR

Filed Jan. 15, 1965  2 Sheets-Sheet 1

INVENTOR
Emmerich SZODFRIDT

BY Dicke + Craig
ATTORNEYS

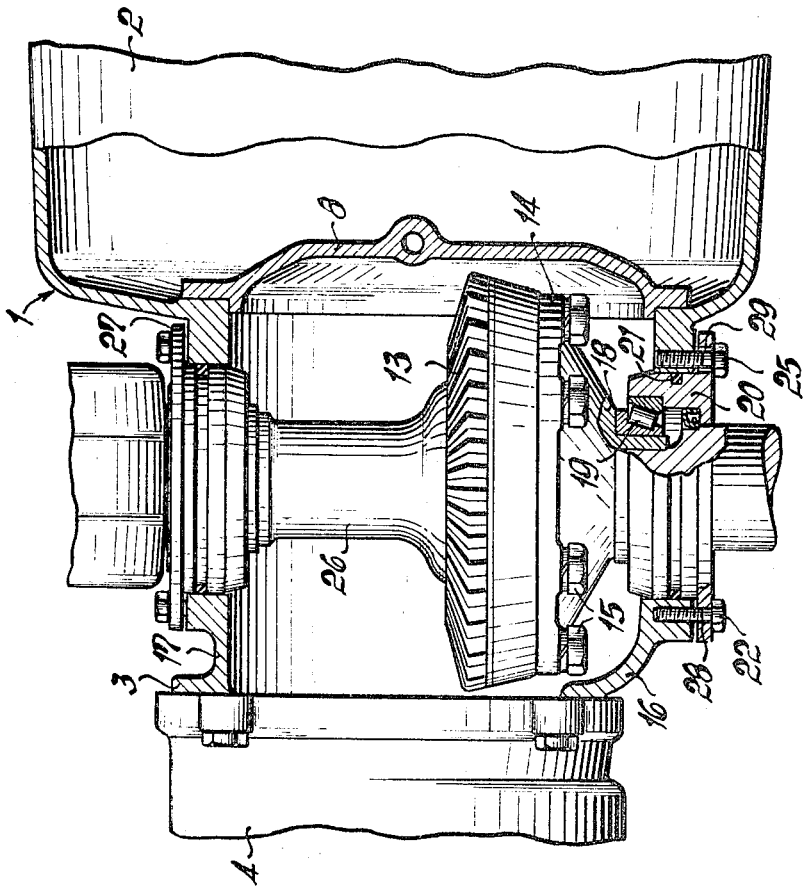

United States Patent Office 3,394,610
Patented July 30, 1968

3,394,610
AXLE GEAR
Emmerich Szcdfridt, Ditzingen, Germany, assignor to Firma Dr. Ing. h.c. F. Porsche KG., Stuttgart-Zuffenhausen, Germany
Filed Jan. 15, 1965, Ser. No. 425,886
Claims priority, application Germany, Jan. 24, 1964, P 33,442
11 Claims. (Cl. 74—402)

The present invention relates to a differential gear for vehicles, especially motor vehicles which is supported in a possibly multi-partite housing of light metal.

With differential gears which are accommodated in light metal housings, it is customary to arrange the bevel gear or pinion of the differential gear on a shaft end or axle stub directly adjacent a housing end wall. The axle-drive bevel wheel or spur bevel gear is thereby supported together with the differential gear and the wheel drive shafts in the side walls of the housing. As a result thereof, each change in length of the housing section within the area between the bearing for the pinion and the bearings for the differential become substantially completely effective so that the meshing of the teeth between the pinion and the spur bevel gear becomes inaccurate. The play of the tooth flanks or teeth surfaces can thereby attain very high values as the temperature fluctuations to which the parts of the gear are exposed, especially during winter operation, are large.

In order to eliminate at least partially the expansion in dependence on the temperature in length of the light metal housing, proposals have already been made heretofore in the prior art to provide the housing with supporting parts made of steel. These measures are complicated and expensive whereby also the advantage of the light metal construction is lost again by the additional weight.

The goal on which the present invention is predicated essentially consists, contrary to the proposals made known heretofore, which aimed at a suppression of the expansion of the housing or of the section of the housing walls effective on the differential, to support the pinion in such a manner that it undergoes during warming up of the housing the same or at least corresponding movements.

This is achieved in accordance with the present invention in that a drive shaft made of steel, carrying the pinion of the differential and supported in opposite walls of the housing, extends through the housing, whereby the drive shaft is guided in the housing within the bearing remote from the pinion by a fixed bearing and within the bearing closest to the pinion by a loose or movable bearing. The displacement or movement of the pinion in dependence on the temperature takes place by the expansion of the drive shaft. This shaft is, as viewed from the fixed bearing, for the most part twice as long as the distance of the support of the differential from the plane of the loose bearing so that the longitudinal expansion of the parts or sections during heating or warming up become essentially equally large. As a result thereof, no change or only an insignificant change in the tooth flank play occurs between spur bevel gear and pinion so that this measure, which does not cause any substantial increase in cost improves the quietness of operation and reduces advantageously the wear of the parts.

With a differential gear which is supported in the light metal housing by means of detachably secured support or fastening members, it is further proposed according to the present invention, that of the bolts, serving for the purpose of fastening the support members at the housing, those bolts disposed closest to the fixed bearing of the drive shaft are constructed as fitted or reamed bolts. The remaining bolts are intsalled into the support members with radial play. It is thereby prevented that stresses occur at the securing places of the differential in the housing. However, there is also achieved simultaneously therewith that only a predetermined length of the siedwall of the housing becomes effective on the differential or the support thereof with a thermal expansion. It is of advantage if the fitted or reamed bolts are arranged in a vertical transverse plane of the differential gear within the area between the fixed bearing and the wheel drive shafts connected with the differential gear. The installation plane of the fitted or reamed bolts thereby extends at such a distance from the plane of the fixed bearing that the medium or average thermal expansion of the wall section of the housing to be expected under normal operation and determinative for the support of the differential gear are substantially equal to the thermal expansion of the drive shaft between the fixed bearing and the pinion. With such an arrangement the thermal expansion also of large wall parts can be properly taken into consideration with the most simple means without additional expenditures and may be made ineffectual on the angular drive in a far-reaching manner.

Accordingly, it is an object of the present invention to provide a differential gear for vehicles, especially motor vehicles, which avoids the aforementioned shortcomings and drawbacks encountered with the prior art constructions by extremely simple and effective means.

Another object of the present invention resides in the provision of a differential gear construction supported within a light metal housing which effectively renders the undesirable effects of thermal expansion of the parts ineffectual insofar as the meshing engagement in the differential gear is concerned.

A further object of the present invention resides in the provision of a differential gear within a light metal housing so constructed and arranged as to effectively eliminate any play of the tooth flanks that normally results from thermal expansion during temperature fluctuations, especially during winter operation of the vehicle.

Another object of the present invention resides in the provision of a differential gear which is substantially unaffected by temperature fluctuations without relinquishing the advantages of light metal construction and without attempting to suppress the thermal expansions of the housing parts.

Still another object of the present invention resides in the provision of differential gear construction effectively eliminating the undesirable effects of thermal expansions by means that are neither complicated nor expensive.

Still a further object of the present invention resides in the provision of a light weight differential gear structure that exhibits greater quietness of operation, reduced wear of the parts and greater assurance of proper meshing of the various gears thereof.

A further object of the present invention resides in the provision of a light metal housing for a motor vehicle differential gear in which the various parts are so constructed and arranged as to avoid stresses in the housing as a result of temperature fluctuations.

These and other objects, features and advantages of the present invention will become more obvious from the following description when taken in connection with the accompanying drawing which shows, for purposes of illustration only, one embodiment in accordance with the present invention, and wherein:

FIGURE 1 is a partial elevational view of a differential gear housing of a motor vehicle in accordance with the present invention, partially in cross section, and FIGURE 2 is a cross sectional view taken along line II—II of FIGURE 1.

Referring now to the two figures of the drawing wherein like reference numerals are used to designate like parts, the gear housing made of light metal such as aluminum, aluminum alloys, etc. is generally designated therein by reference numeral 1 and is composed of several parts essentially comprising a housing part 2 having an offset pot-shaped section 3. A further housing part 4 adjoins the houisng part 3. A conventional change-speed gear (not shown) is accommodated within the housing part 4 which is in driving connection with a clutch (not shown) arranged in the housing part 2 by way of a shaft 5. This clutch is driven, for example, by an internal combustion engine (not shown) flangedly connected to the housing part 2.

A conventional differential gear is accommodated in the pot-shaped section 3 of the housing part 2 of the gear housing. The differential gear is driven by the aforementioned change-speed gear (not shown) accommodated in housing part 4 by way of a hollow drive shaft 6 arranged coaxially to the shaft 5. The hollow shaft 6 is supported in a wall 7 of the housing section 3 and in a wall 8 suitably secured to the housing section 2. This wall 8 closes off the housing section 3 and separates the same from the clutch accommodated in the housing part 2. The bearing 9 for the hollow shaft 6 secured or held in the wall 7 is constructed as fixed bearing, for example, as ball bearing. The hollow shaft 6 is held fast radially and axially by this bearing 9. The bearing 11 accommodated in the wall 8 by interposition of a bushing 10 is constructed as loose or free bearing, for example, as needle bearing. The hollow shaft 6 is held exclusively radially by this bearing 11 and is able to move unimpededly possibly in the axial direction within this bearing 11 within given limits.

A bevel gear 12 is secured on the hollow shaft 6 which meshes with a bevel gear 13. The bevel gear 13 is shown in FIGURE 2 but has been omitted in FIGURE 1 for sake of clarity. The bevel gear 13 is secured at a housing part 14 by means of bolts or screws 15. A conventional differential gear is accommodated within housing 14. The housing 14 is rotatably supported in oppositely disposed walls 16 and 17 of the pot-shaped housing section 3. For that purpose, the housing 14 is provided with a ring-shaped extension 18 on which is supported a cone bearing 19. This cone bearing 19 is supported in a sleeve 20 which is accommodated in a bore 21 of the wall 16. The sleeve 20 is secured at the wall 16 by means of bolts 22, 23, 24 and 25.

For purposes of supporting the housing 14 in the wall 17, the housing 14 is provided with a tubularly-shaped extension 26 which extends up to the wall 17. The support of this extension 26 in the wall 17 takes place by means of a sleeve 27 in the same manner as the support of the extension 18 in the wall 16.

The bevel gear drive 12, 13 and shafts 5 and 6 are made of steel whereas transmission housing 1 is made of light metal such as aluminum, aluminum alloys or the like. In operation, these parts are subjected to a thermal expansion corresponding to the particular materials. Since the materials of steel and light metal possess very different thermal expansion coefficients, the thermal expansion is effective very disadvantageously on the meshing engagement of the teeth if not appropriate measures are taken. These measures consist according to the present invention in that the drive pinion 12 for the differential gear is so arranged and the associated drive shaft 6 is so supported that without additional expenditures the expansion to be expected as a result of warming up of the parts is far-reachingly eliminated in its effect on the meshing engagement of the gear teeth.

The shaft 6 carrying the pinion 12 is held fast axially and readily in the bearing 9 arranged remote from the pinion 12. The bearing 11 is a loose bearing and solely effects a radial guidance of the shaft 6. As a result thereof, the shaft 6 can expand during warming up in the direction of the loose bearing 11 whereby the section of the shaft 6 between the fixed bearing 9 and the pinion 12 is determinative for the axial displacement of the pinion 12.

The spur bevel gear 13 cooperating with the pinion 12 is supported by means of the housing 14 and extension 26 in the side walls 16 and 17 of the transmission housing so that during warming up of the housing the expansion of the housing section between the fixed bearing 9 for the shaft 6 and the supports 20, 27 for the differential gear housing 14 is determinative. This wall length effective during thermal expansion is substantially half as long as the effective length of the shaft 6 so that the length ratio is equal to the ratio of the thermal expansion coefficients of the materials of light metal and steel. The same expansion value of the aforementioned parts is achieved thereby so that no substantial change in the play between the teeth flanks occurs in the bevel gear drive 12, 13.

The sections of the walls 16, 17 determinative for the displacement of the housing 14 may be changed accordingly to the present invention. This is achieved by the bolts 22–25. Of these bolts, the bolt 22 is constructed as fitted or reamed bolt. The passage bores 29 for the bolts 23, 24, 25 within flange 28 of the bushing or sleeve 20 are larger than the shank diameter of the bolts. As a result thereof, only by way of the fitted or reamed bolt 22 is a displacement transmitted to the housing 14 which corresponds to the thermal expansion, for example, of the wall 16 over the length between fixed bearing 9 and bolt 22. The bolts 23–25 disposed more remote from the fixed bearing 9, therefore, have no effect owing to the play in the flange 28 on the sleeve 20 so that also the larger value of the thermal expansion of the housing wall within these areas remains ineffectual on the support of the differential gear.

It is possible thereby to vary by predetermined arrangements of fitted or reamed bolts at the flange of the sleeve 20 the effective length of the wall section effective for the displacement of the differential gear by the thermal expansion of the gearing housing and therewith to take into consideration the thermal expansion of further parts, for example, of the spur bevel gear of the differential gear.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A gear assembly, especially for motor vehicles, which is supported in a light metal housing having wall means, comprising: a first bevel gear; second bevel gear meshing with said first bevel gear; drive shaft means of steel carrying said second bevel gear and extending through oppositely disposed wall means of the housing; fixed bearing means supporting said drive shaft means in the wall means remote from said second bevel gear; loose bearing means guiding said drive shaft means in the wall means closest to said second bevel gear; detachably secured support means supporting said first bevel gear in said housing, including a plurality of bolt means; a first one of said bolt means being disposed nearest said fixed bearing means and being constructed as a fitted bolt; and the remaining bolt means having radial play.

2. A gear assembly, according to claim 1, wherein:
said fitted bolt means being arranged within a vertical transverse plane of the first bevel gear within the area between the fixed bearing means and the first bevel gear.

3. A gear assembly, according to claim 2, wherein:
the plane of installation of the fitted bolt means extending from the plane of the fixed bearing means at such a distance that the average thermal expansions of the wall section of the housing means supporting said first bevel gear are essentially equal to the thermal expansion of the drive shaft means between said fixed bearing means and said second bevel gear.

4. A a gear arrangement comprising:
a support;
a shaft having an axis;
first means mounting one portion of said shaft on said support for preventing relative axial and radial movement and providing free expansion of said shaft in its axial direction relative to said support on one axial side of said one portion;
a first toothed gear axially fixed on a second portion of said shaft axially spaced a first predetermined substantial distance from said one portion on said one axial side;
a second toothed gear in driving engagement with said first gear;
second means mounting said second gear on said support a second predetermined distance, measured in said axial direction, from said first means;
said support between said first and second means having a coefficient of thermal expansion substantially different from the coefficient of thermal expansion of said shaft between said first means and said first gear; and
the ratio of said first distance to said second distance being approximately equal to the ratio of said support coefficient of thermal expansion to said shaft coefficient of thermal expansion so that the thermal expansion of said first distance will substantially equal the thermal expansion of said second distance to maintain the proper tooth engagement of said first and second gears over a wide temperature range.

5. The gear assembly according to claim 4, including further means for substantially eliminating stresses in the supports of said pinion and gear in said housing.

6. The device of claim 4, wherein said gear arrangement is a differential bevel gear arrangement with said first gear being a differential drive bevel gear and said second gear being a differential ring bevel gear having an axis at right angles to the axis of said first gear.

7. The device of claim 6, wherein said shaft is constructed of steel and said support is constructed of aluminum.

8. The device of claim 7, wherein said first means includes a radial and axial thrust roller bearing mounting said one portion and a radial thrust axial lost motion roller bearing mounting said second portion of said shaft.

9. The device of claim 8, wherein said second means is a radial and axial thrust bearing having a plurality of bolt means connecting it to said support, at least one of said bolt means preventing movement of said second means bearing in said axial direction, and at least others of said bolt means allowing free expansion in said axial direction between said second means bearing and said support.

10. The device of claim 4, wherein said first means includes a radial and axial thrust roller bearing mounting said one portion and a radial thrust axial lost motion roller bearing mounting said second portion of said shaft.

11. The device of claim 4, wherein said second means is a radial and axial thrust bearing having a plurality of bolt means connecting it to said support, at least one of said bolt means preventing movement of said second means bearing in said axial direction, and at least others of said bolt means allowing free expansion in said axial direction between said second means bearing and said support.

References Cited
UNITED STATES PATENTS

| | | | |
|---|---|---|---|
| 962,059 | 6/1910 | Shirley | 74—713 X |
| 1,761,934 | 6/1930 | Ormsby et al. | 74—100 |
| 2,149,009 | 2/1939 | Chievitz | 308—207 |
| 2,467,416 | 4/1949 | Worel | 308—189 |
| 2,735,734 | 2/1956 | Kalikow | 308—189 |
| 3,214,224 | 10/1965 | Lash | 308—176 |

FRED C. MATTERN, Jr., *Primary Examiner.*

J. A. WONG, *Assistant Examiner.*